United States Patent Office 3,378,168
Patented Apr. 16, 1968

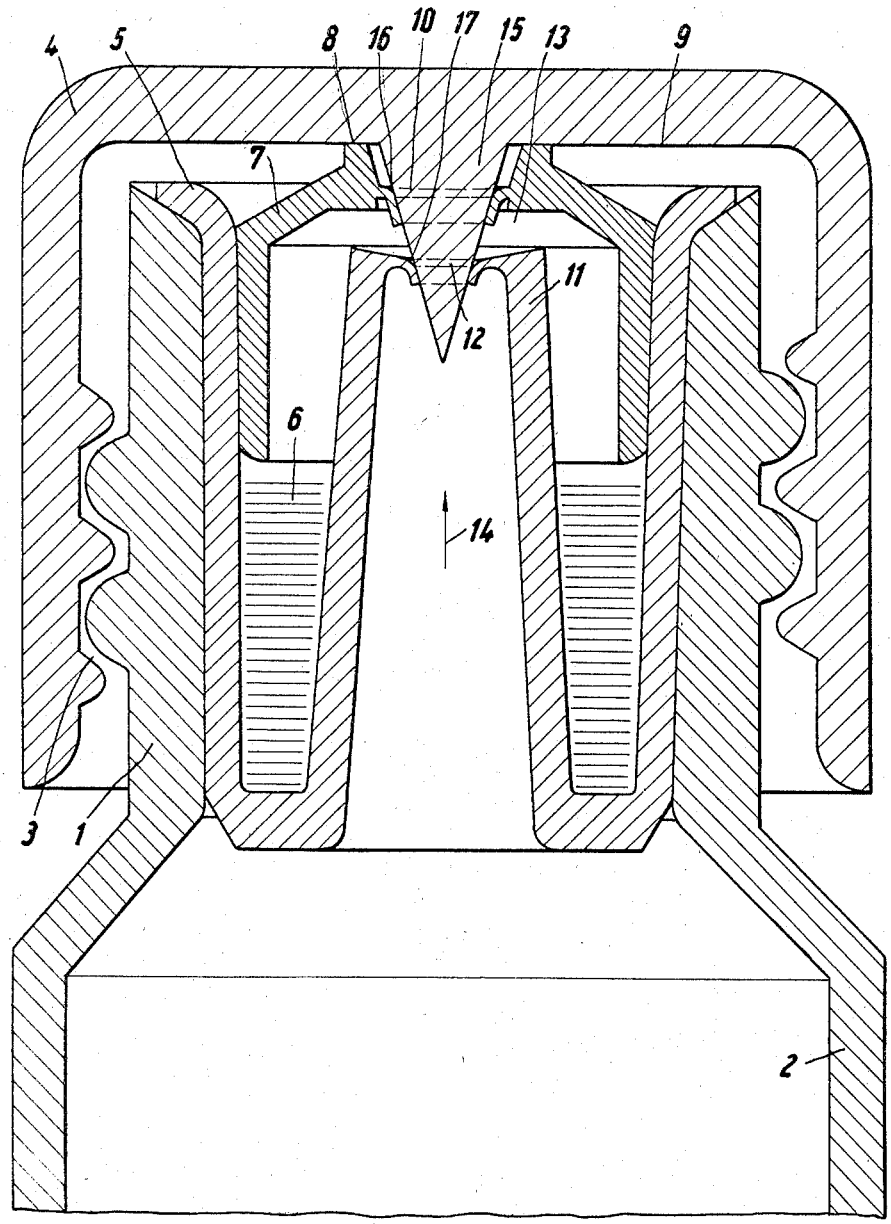

3,378,168
ARTICLE FOR HOLDING MATERIALS WHICH ARE TO BE MIXED TOGETHER UPON ISSUING FROM THE ARTICLE
Paul Gustav Hildebrandt, 10 Fuchssteiner Weg 1, Berlin 28, Germany
Filed Jan. 18, 1967, Ser. No. 610,133
Claims priority, application Germany, Jan. 20, 1966, H 58,295
5 Claims. (Cl. 222—83)

ABSTRACT OF THE DISCLOSURE

An article having an outer container for one material and an inner container for a second material which is to be mixed with the material in the outer container, the inner container being situated in a mouth of the outer container and having an inner tubular wall through which the material of the outer container discharges. The inner container has an outer tubular wall surrounding and spaced from its inner tubular wall to define a space for holding the second material, and the end of the inner tubular wall of the inner container which is directed away from the interior of the outer container is provided with a flexible closure diaphragm, while the inner container has an outer end wall also provided with a closure diaphragm closing the inner container. The two diaphragms are aligned with each other as well as with the inner tubular wall of the inner container. A hollow cap means coacts with the mouth of the outer container to releasably close the latter, and this hollow cap means as an inner end surface directed toward the outer end wall of the inner container and carrying an elongated piercing means which, when the hollow cap means is initially mounted on the mouth of the outer container, pierces through the diaphragm of the outer end wall of the inner container and then through the diaphragm at the end of the inner tubular wall of the inner container, the space between these diaphragms forming a mixing chamber for the two materials. The piercing means thus forms in the diaphragms openings conforming precisely to the configuration of the piercing means so as to coact with the latter to reliably maintain the interiors of both containers closed when the hollow cap means closes the mouth of the outer container. On the other hand, when the hollow cap means is removed the pierced diaphragms form openings through which both materials can discharge, the materials mixing in the mixing chamber so as to be mixed together upon issuing from the article.

---

The present invention relates to an article for holding materials which are to be mixed with each other upon issuing from the article.

Thus, for example, the present invention relates to that type of article which is designed to hold a pair of liquids which are maintained separate from each other in the article until the latter is manipulated to discharge the liquids simultaneously therefrom in a manner mixing the liquids together. Such articles will conventionally include, for example, an outer plastic container which is flexible so that the operator can squeeze the container to cause the contents thereof to discharge. Such an outer container may conventionally be provided with a second container containing a second liquid separate from the liquid which is in the outer container, the two liquids mixing together when the article is used. Such a construction is required, for example, when certain fruit juices are stored in such articles.

For example, when lemon juice is extracted from lemons, the odor and taste of the lemon peel or skin is lacking because the skin is initially removed from the lemon before the juice is extracted therefrom. While attempts have been made to add to the lemon juice the aromatic materials, in liquid form, which are in the peel of the lemons, it has been found that a mixture of these materials is disadvantageous in that the aromatic materials of the lemon skin will, during a mixture storage of long duration, be destroyed by the lemon juice as a result of the action of the acid therein. For these reasons, it is required that when the lemon juice container is not used, the lemon juice and the aromatic material of the lemon peel be maintained separate from each other, these ingredients being mixed together only immediately upon issuing from the container.

In order to achieve this latter result, it is necessary to add the aromatic essence of the lemon peel each time lemon juice is discharged from the container so that the aromatic material will be added to the lemon juice at each use of the article, and in addition the two materials must be discharged at amounts which have a proper proportion with respect to each other. For this purpose it is known to provide in the relatively wide mouth of a plastic spray bottle a cup-shaped insert which is pressed in an air-tight manner into the neck of the mouth of the spray bottle. This insert forms a small container which holds the aromatic material in liquid form. The inner container has a bottom wall from which a centrally arranged spray tube extends, the fruit juice in the outer container issuing through the latter spray tube, inasmuch as the bottom end of the latter is open while its top end is provided with a flexible closure diaphragm. The inner cup-shaped container is closed by a cap member inserted into the upper part of this inner container and having an inner surface situated close to the upper edge of the spray tube, this surface of the closure member for the inner container also having a flexible diaphragm in its central portion. Thus, these diaphragms serve to close both of the containers, respectively.

When an article of this known constructions is to be used, it is required that the diaphragm of the of the inner container as well as the diaphragm at the end of the spray tube both be pierced from the exterior with a suitable tool, so that on the one hand the cup-shaped insert will initially be opened and then the spray tube will be opened. Thus, when pressure is now applied to the plastic spray bottle, the lemon juice will issue through the spray tube, and when the article is directed downwardly part of the liquid aromatic material in the cup-shaped insert will also be extracted from the interior of the latter to issue with the juice which is discharged through the spray tube. When the use of the article is terminated the plastic outer container is closed again by a suitable closure cap, for example, which is screwed onto an outlet mouth of the outer container.

This known construction has several disadvantages. One of the disadvantages resides in the fact that when the article is to be initially used, the article is not yet in a proper condition for use. It is essential initially to apply to the article a tool by means of which the membrane in the closure member of the inner container and then the membrane or diaphragm at the end of the spray tube are pierced. Such a tool is not always at hand and its use requires, in addition, the exertion of a considerable amount of force if the diaphragms have a certain thickness, which is highly likely for manufacturing reasons. A further disadvantage of this known construction resides in the fact that even when, after the initial use of the article, it is closed by a closure cap which is threaded onto the outer container, the interior spray tube remains open at its upper end as a result of the piercing of the diaphragm situated at the upper end of the spray tube, so that especially when the container lies in a horizontal position or is tipped, part of the fruit juices will have access to the interior of the cup-shaped insert so as to carry out its destructive action on the aromatic contents of the insert.

It is, accordingly, a primary object of the present invention to provide an article which will avoid the above drawbacks.

In particular, it is an object of the invention to provide an article of the above type made of plastic, for example, which, however, when the article is to be used does not require the application of a special tool thereto.

In addition, it is an object of the present invention to provide an article of the above type which, when it is not in use, even after the initial use thereof, will nevertheless reliably maintain the chambers in which the different materials are located tightly shut off one from the other so that mixing together of the materials when the article is not used is reliably prevented.

Thus, in accordance with the invention, the article thereof includes an outer container having a mouth through which material in the outer container is discharged. Situated within the mouth of the outer container is an inner container having an inner tubular wall through which the material in the outer container discharges upon flowing through the mouth of the outer container, and this inner tubular wall has an inner open end directed toward the interior of the outer container and an outer end directed away from the interior of the outer container and carrying a flexible closure diaphragm. The inner tubular wall of the inner container is surrounded by an outer tubular wall thereof which is spaced from the inner tubular wall to define therewith a chamber for holding a second material which is to be mixed with the material of the outer container, and this inner container has an outer end wall provided with a flexible closure diaphragm aligned with and spaced from the closure diaphragm at the end of the inner tubular wall which is directed away from the interior of the outer container, and these two closure diaphragms define between themselves a mixing chamber for the materials of the inner and outer containers.

A hollow cap means is removably carried by the outer container at its mouth for releasably closing the article, and this hollow cap means has an inner end surface directed toward the outer end wall of the inner container and carrying a piercing means which, when the hollow cap means is initially applied to the outer container, pierces first through the diaphragm of the outer end wall of the inner container and then through the diaphragm at the outer end of the inner tubular wall of the inner container, so that the piercing means extends through both diaphragms when the cap means is in its position closing the outer container. Since the diaphragm openings are formed by the piercing means itself, which remains permanently fixed to and forming part of the closure cap for the outer container, a reliable seal is maintained at the pierced diaphragms by the piercing means itself, thus preventing contact of the two materials with each other until after the cap means together with the piercing means are removed, so that the two materials can issue through the pierced diaphragms, the materials mixing together in the mixing chamber between the diaphragms before using in mixed condition through and beyond the pierced diaphragm of the outer end wall of the inner container.

Thus, the piercing means of the structure of the invention forms a double valve for simultaneously closing both containers to maintain the liquids thereof separate from each other when the hollow cap means is in its position closing the outer container. The piercing means may be in the form of an elongated piercing member of conical, pointed configuration which, while it may be of a conical configuration throughout its length, nevertheless, may, if desired, have in the region of the inner end surface of the hollow cap means a cylindrical configuration.

The invention is illustrated by way of example in the accompanying drawing which forms part of this application and in which one possible embodiment of the invention is shown in FIG. 1a at a relatively enlarged scale in a longitudinal sectional elevation showing only that part of the article which is necessary to afford a complete understanding of the invention.

FIG. 1b illustrates schematically a second embodiment of the piercing means of the article of this invention.

Referring now to the drawing, there is shown therein an outer container 2 which forms a spray bottle and which is made of a plastic material such as a flexible plastic material enabling the user to squeeze the bottle so as to cause the contents thereof to be discharged therefrom. The outer container 2 has an integral neck or mouth 1 provided with exterior threads 3. A hollow cap means 4 is provided for closing the container 2, and for this purpose the hollow cap means 4 has interior threads which coact with the threads 3 so that the cap means 4 can be displaced to and from the position shown in the drawing where the cap means 4 closes the article.

Fixed to the outer container 2, at the interior of its mouth 1, is an inner container 5 in the form of an insert of cup-shaped configuration, and the inner container 5 is adapted to hold a material such as the liquid 6 which may, for example, be the aromatic material referred to above. The insert 5 has an outer tubular wall directly engaging and fixed in any suitable way to the inner surface of the mouth 1 of the outer container 2, and the inner container 5 is closed by an outer end wall 7 which is fixed to the outer tubular wall of the container 5 at the inner surface of this outer tubular wall. The outer end wall 7 of the inner container 5 is provided in the illustrated example with an outwardly directly annular sealing lip 8 which is engaged by the inner end surface 9 of the hollow cap means 4 when the latter is in the illustrated position closing the article, so that a seal is provided by the coaction of the surface 9 and the lip 8, the inner container 5 together with the end wall 7 thereof also being made of a suitable plastic material.

The lip 8 of the outer end wall 7 surrounds a flexible closure diaphragm 10 of the end wall 7, so that this diaphragm 10 is centrally situated with respect to both of the containers 2 and 5. The article includes a spray tube 11 in the form of an inner tubular wall of the inner container 5, this inner tubular wall being tapered as shown in the drawing and being surrounded by and spaced from the outer tubular wall of the inner container 5 so as to define with this outer tubular wall the space which receives the material 6 which is contained within the inner container 5. The inner tubular wall 11 of the inner container 5 has an open end directed toward the interior of the outer container 2 so that the contents thereof can flow in the direction of the arrow 14 into and through the spray tube 11, and at its outer end, which is directed away from the interior of the container 2, the inner tubular wall 11 is closed by a flexible closure diaphragm 12 which is integral with the remainder of the inner tubular wall 11 and which is aligned with and spaced from the diaphragm 10. The space between the diaphragms 10 and 12 forms a mixing chamber 13 in which the material 6 of the inner container 5 and the material of the outer container 2 mix together during flow of the material from the outer container 2 in the direction of the arrow 14 through the inner tubular wall 11 of the inner container 5.

The hollow cap means 4 of the invention fixedly carries a piercing means 15 which in the illustrated example takes the form of a conical projection integral with the cap 4 and projecting from the inner surface 9 thereof, this piercing means 15 terminating distant from the surface 9 in a relatively sharp point forming a tip which is adapted to pierce through the diaphragms 10 and 12. In its position extending through the diaphragms 10 and 12 the piercing projection 15 presses against and engages the peripheral edge portions 16 and 17 of the openings which are respectively formed in the flexible diaphragms by the piercing means itself.

The operation of the above-described structure of the invention is as follows:

Before use is made of the article of the invention, and in particular of the material in the containers 2 and 5, these materials are closed within the containers 2 and 5 by the diaphragms 12 and 10, respectively, so that the materials cannot escape from the closed containers. Thus, before the cap means 4 is mounted on the outer container 2, the diaphragm 12 is unbroken and provides a complete closure for the container 2, while the other liquid 6 in the inner container 5 is maintained completely enclosed within the container 5 by the closure diaphragm 10 which is still in its unbroken condition.

When the hollow cap means 4 is initially threaded onto the mouth 1 of the outer container 2, the tip of the piercing means 15 will initially pierce through the diaphragm 10, and during the continued threading of the hollow cap means 4 onto the outer container 2, the piercing means 15 will then pierce through the diaphragm 12 so as to provide in this way openings passing through both of the diaphragms. The exterior surface of the conically-shaped piercing means 15 presses fully against the circular edges 16 and 17 of the openings formed in the diaphragms 10 and 12, so that with the piercing means extending through these openings it is not possible for the material 6 to discharge from the container 5 or for the material in the outer container 2 to flow out through the inner tubular wall of the inner container 5 and thus no mixing or contact between these materials is possible.

When it is desired to discharge the materials from the article of the invention, the hollow cap means 4 is unscrewed from the outer container 2, and the article is inverted so that the openings of the diaphragms are directed downwardly. Because of the previously formed openings in these diaphragms, which were provided by way of the piercing means 15, these openings are now unplugged so that when the operator squeezes the spray bottle 2 the latter becomes deformed and thus the material therein can be discharged under pressure through the inner tubular wall 11 and the opening in the diaphragm 12 into the mixing chamber 13. This material is additionally forced to discharge through the opening in the outer diaphragm 10. Because of the tilted or substantially inverted position of the article the liquid 6 in the inner container 5 has reached the mixing chamber 13 and part of the material 6 is carried along with the material issuing from the outer container 2 through the tube 11. Therefore, with this construction a mixture of both materials will issue from the opening of the outer end wall 7 of the inner container 5.

When the discharge of the mixed liquids is terminated the user will replace the cap means 4, threading it back onto the mouth 1 of the outer container 2, and piercing means 15 will now again extend through the openings which were previously formed by the piercing means in the flexible closure diaphragms 10 and 12. The tapered exterior surface of the piercing means 15 will thus again press against the peripheral edge portions 16 and 17 of the openings formed in the diaphragms. As a result, the openings in the diaphragms 10 and 12 are completely closed in a fluid-tight manner, and there is absolutely no communication between the different materials, nor is such communication possible as long as the cap means 4 is in its closed position shown in the drawing.

When the inner end surface 9 of the cap means 4 engages the sealing lip 8 of the end wall 7, an additional seal is provided, but this latter additional seal is by no means essential.

The advantages achieved with the structure of the invention are as follows:

In the first place there is no necessity for a special tool to pierce through the diaphragms. Aside from the fact that such a tool is not always at hand, tools which are unsuited for such a purpose may be frequently used, so that a non-uniform and improperly shaped opening is provided in each diaphragm, with the result that the mixing operations are unfavorably influenced.

The structure of the present invention also provides the advantage of guaranteeing that only circular openings will be formed in the diaphragms, openings of this configuration providing the best possible and proper mixing actions, so that the mixing is enhanced not only by the shapes of the openings but also by the sizes thereof.

In addition, there is the advantage that the user need only exert a relatively small force in order to make the openings in the diaphragms.

Yet another advantage of the structure of the invention resides in the fact that when the structure is not used, both of the containers are completely closed in a fluid-tight manner, so that even if the article should be lying down in a horizontal attitude an unexpected mixing of the materials cannot take place in any case. This advantage is of particular importance because in this way the contents of both containers can be stored for practically an unlimited time while still remaining completely useful.

The invention of course is not limited to the details shown in the drawing and described above. Thus, for example, the piercing means 15 need not be entirely of a conical configuration, as shown in the drawing. Instead, for example, only the lower substantially pointed portion need be of a conical or tapered configuration, while the upper end of the piercing means, in the region of the surface 9, can be of a cylindrical or approximately cylindrical configuration. Moreover, the materials within the containers need not be liquid lemon juice and aromatic material, as specifically referred to in the above example, and instead, other materials, which also may be in liquid form, can be separately stored in the article of the invention, where these materials are such that they will remain stable in a mixed condition for only a short period of time.

Although my invention has been illustrated and described with reference to the preferred embodiment thereof, I wish to have it understood that it is in no way limited to the details of such embodiment but is capable of numerous modifications within the scope of the appended claims.

What is claimed is:

1. An article for holding materials which are to be mixed together upon issuing from the article, comprising an outer container for one material, said outer container having a mouth through which said one material is adapted to be discharged from said outer container, an inner container fixedly carried by said outer container in said mouth thereof and having an inner tubular wall through which the material in said outer container is adapted to flow during discharge through said mouth of said outer container, said inner tubular wall having an inner open end directed toward the interior of said outer container and an outer end distant from said inner open end, said inner container having a flexible closure diaphragm extending across and closing said outer end of said inner tubular wall, and said inner container having an outer tubular wall surrounding and spaced from said inner tubular wall and defining with the latter a space for another material which is to be mixed with the material in said outer container, said inner container having an outer end wall extending across the space defined by said outer tubular wall for closing said inner container, said outer end wall of said inner container being spaced from said outer end of said inner tubular wall thereof and having a flexible closure diaphragm aligned and spaced from the diaphragm which closes said outer end of said inner tubular wall, said diaphragms defining between themselves a mixing chamber in which the materials are adapted to mix upon issuing from the containers, hollow cap means coacting with said mouth of said outer container for releasably closing the latter and having an inner end surface directed toward and situated adjacent said outer end wall of said inner container, and piercing means carried by said hollow cap means in the interior thereof and projecting from said inner end surface thereof toward the interior of said outer container while being aligned with said flexible diaphragms, so that when said hollow cap means is placed on said mouth of said outer container to close the latter said piercing means will advance toward the interior of said outer container passing first through and piercing the diaphragm of said outer end wall of said inner container and then through and piercing the diaphragm which closes said outer end of said inner tubular wall of said inner container, while said flexible diaphragms engage the exterior surface of said piercing means to maintain both containers closed and out of communication with each other when said hollow cap means closes said mouth of said outer container, whereby upon removal of said hollow cap means from said mouth of said outer container said piercing means will be displaced from the pierced diaphragms so that the materials in both containers can then issue through the pierced diaphragms, mixing together in said mixing chamber and issuing in mixed condition through the diaphragm of said outer end wall of said inner container so as to be released from both containers.

2. The combination of claim 1 and wherein said piercing means is of a tapered pointed configuration having a tip distant from said inner end surface of said hollow cap means and piercing through said diaphragms when said hollow cap means is initially placed on said mouth of said outer container.

3. The combination of claim 2 and wherein said piercing means is of a conical configuration and extends integrally from said inner end surface of said hollow cap means.

4. The combination of claim 2 and wherein said piercing means has a cylindrical configuration in the region of said end surface of said hollow cap means and a substantially pointed, conical configuration in the region passing through said diaphragms when said hollow cap means is in a position closing said outer container at said mouth thereof.

5. The combination of claim 1 and wherein said outer end wall of said inner container has an annular lip extending around said diaphragm of said outer end wall and extending toward said inner end surface of said hollow cap means, said inner end surface of said hollow cap means engaging said lip when said hollow cap means is in a position closing said outer container at said mouth thereof for providing a closure seal with said lip.

References Cited
UNITED STATES PATENTS

| | | | |
|---|---|---|---|
| 2,389,385 | 11/1945 | Owen | 222—546 X |
| 2,559,231 | 7/1951 | Seemar | 206—47 |
| 2,789,731 | 4/1957 | Marraffino | 222—94 X |
| 3,002,658 | 10/1961 | Sajda | 222—94 |
| 3,182,858 | 5/1965 | Beaudoin | 222—83 |

FOREIGN PATENTS

| | | |
|---|---|---|
| 536,023 | 3/1955 | Belgium. |
| 969,791 | 12/1950 | France. |

ROBERT B. REEVES, *Primary Examiner.*

N. L. STACK, *Examiner.*